UNITED STATES PATENT OFFICE.

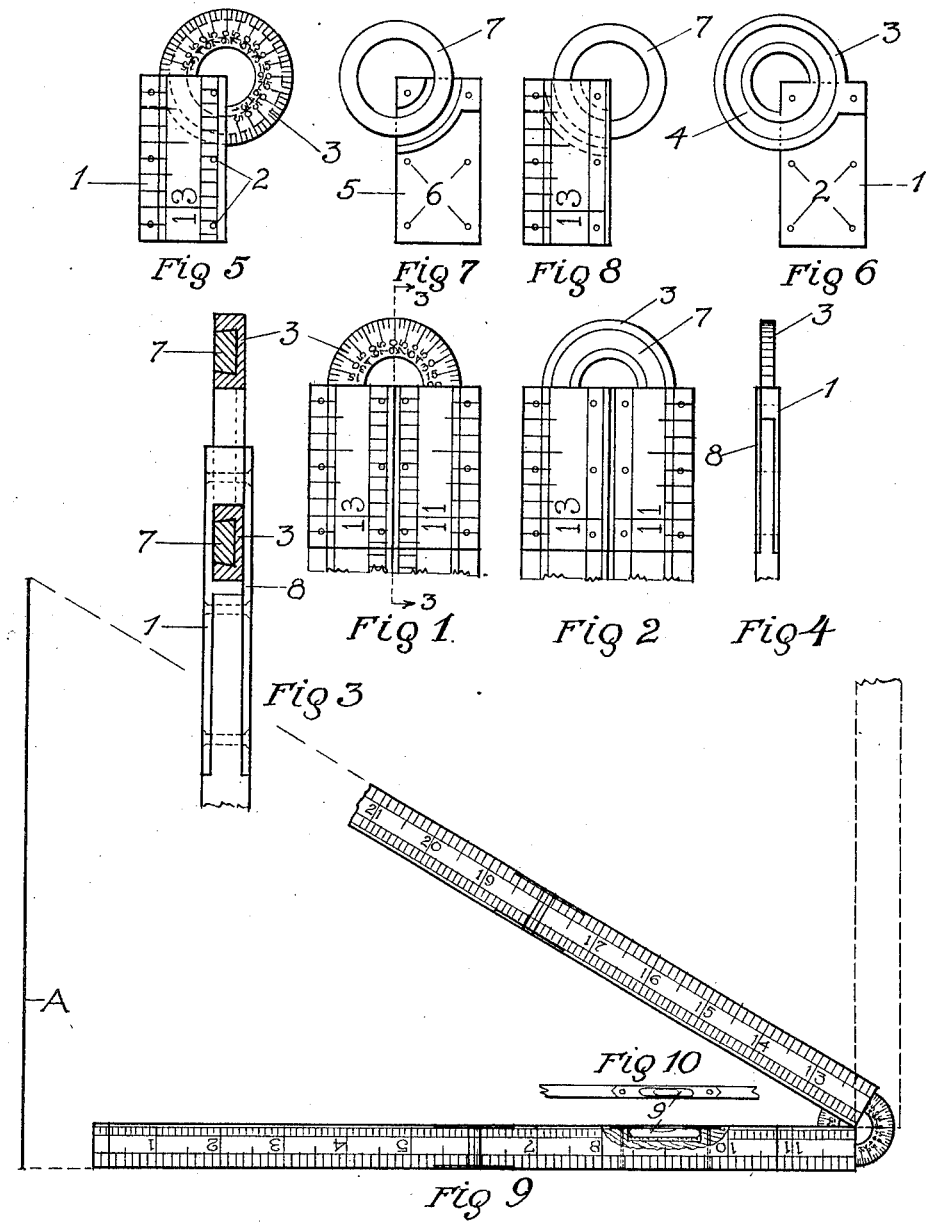

HENRY MEISTER AND GEORGE BIRNBACH, OF PORTLAND, OREGON.

RULER.

1,086,545.  Specification of Letters Patent.  Patented Feb. 10, 1914.

Application filed December 29, 1911. Serial No. 668,561.

*To all whom it may concern:*

Be it known that we, HENRY MEISTER and GEORGE BIRNBACH, both citizens of the United States, residing in the city of Portland, county of Multnomah, and State of Oregon, have invented certain new and useful Improvements in Rulers, of which the following is a specification.

Our invention relates to rulers, and more particularly to certain improvements in the construction and arrangement thereof whereby a ruler is adapted to perform, not only the usual functions of a ruler, but is also adapted to serve as a protractor for measuring or indicating angles, and also as a spirit level, thus adapting the instrument for measuring or estimating the height of distant objects in a manner hereinafter to be referred to.

Among the salient objects of the invention are,—to provide a combination ruler, protractor and spirit level of simple, practical and convenient form, capable of performing all of the functions of any one or all of said instruments; to provide in a jointed ruler an improved graduated hinge member adapted to hold the parts of said ruler in any adjusted angular positions relative to each other; and to provide in a ruler of the character referred to a spirit level feature whereby said ruler is adapted for ascertaining or measuring angles relative to the horizontal.

The invention will be readily understood from the following description of one embodiment thereof, reference being had to the accompanying sheet of drawings in which we have illustrated the same, and in which,—

Figures 1 and 2 are fragmentary views of a full sized ruler embodying our invention, and showing the opposite sides of the hinge member thereof; Fig. 3 is an enlarged sectional view taken on line 3—3 of Fig. 1; Fig. 4 is an edge view of what is shown in Fig. 2; Figs. 5 and 6, 7 and 8, are opposite side views, respectively, of the two parts of the hinge of said ruler; Fig. 9 is a side view of a half sized two foot ruler, showing adjustment for use as a protractor, and also showing a spirit level feature; and Fig. 10 is a fragmentary edge view showing the spirit level.

Referring now to the drawings, the invention comprises the usual graduated ruler members, made of any of the suitable materials of which rulers are now made.

The principal part of the invention is what we will call a protractor hinge, illustrated in Figs. 5 and 6, and 7 and 8. This hinge comprises a graduated arc or circle of two interfitting parts, the opposite sides of one part of which is shown in Figs. 5 and 6, and the opposite sides of the other part of which is shown in Figs. 7 and 8. The part shown in Figs. 5 and 6 comprises a plate portion 1, adapted to be secured to the end of one of the ruler members by means of rivets through the holes 2—2, said plate being graduated on one side thereof, as indicated in Fig. 5. Said plate portion is provided with a ring 3, flat on one side (the side shown in Fig. 5), and having an annular channel or groove 4 formed in its opposite side (shown in Fig. 6). On the flat side of this ring, as shown in Fig. 5, is a graduated scale dividing it radially into degrees, as indicated. The other part of the hinge, shown in Figs. 7 and 8, comprises a corresponding plate portion 5, graduated on one side, as shown in Fig. 8, and adapted to be secured to the ruler member by means of rivets through holes 6, as is part 1. This plate is also provided with a ring portion 7 adapted to fit closely into the channel or groove 4 in ring 3 on part 1, and so as to be flush therewith when the two parts are put together in the manner indicated in the enlarged sectional view, Fig. 3. We prefer to form the channel 4 slightly undercut around its sides and to form the ring 7 to correspond therewith so that there will be a dovetail fit of the ring 7 within the channel or groove 4. The two parts are assembled and the annular sides of the channel 4 are then pressed together by machinery on to the ring 7 closing in around the ring 7 and forming the dovetail. It is understood, of course, that the outer side of the channel 4 is forced outwardly sufficiently to admit the ring 7 to the channel, after which it is machine pressed around the ring 7. We prefer to make this hinge of steel so that an effective, annular friction joint is secured between the two parts of the hinge, capable of holding the parts in any relative positions to which they may be moved one within the other. The attaching plates 1 and 5 are graduated the same as the ruler members and constitute a continuation of such graduation to the end of the members. The ends of said plates and of the ruler members at the hinge are of square form and always stand in a radial relationship with the graduation marks dividing the hinge arc or circle into degrees, so that when the two ruler members are moved apart, as indicated in Fig. 9, the square end of the ruler member, or plate, registers with some mark on the scale, thereby indicating the relative angle of the two members.

When the parts of the hinge are put together in the manner just described, we provide side plates, as 8, without the ring portions, to fit upon the opposite sides of the ends of the ruler members. These plates or covers are also graduated to correspond with the graduation marks of the ruler members, the same as are plates 1 and 5. This construction affords a very neat and effective friction joint or hinge, with the graduated arc or circle portion, to be interposed between the ruler members. This hinge, it will be noted, has the form of a ring and is so placed that there is an opening therein at the folded end of the parts, which also serves as a means for hanging the ruler upon a pin when not in use.

In Figs. 9 and 10, we have shown a glass tube 9 mounted in the inner edge of one of the ruler members, whereby to constitute a spirit level, as will be readily understood from the showing made. When the ruler member containing the tube is held in a level position, and the other member is raised to a position indicated in full lines in Fig. 9, or to another position, indicated in dotted lines, the square ends of the ruler members, relative to the graduated arc, indicates the angle of the two parts relative to each other. If it is desired to ascertain the height of an object at a certain distance away, as for example, of the line "A" to the left of Fig. 9, by holding the level portion of the ruler in a true horizontal position and sighting along the other member thereof, raising the same until it strikes the top of the line, or object, being measured, you have the angle, and knowing the base, can ascertain the perpendicular. This is only one of the uses to which the instrument can be put.

We have shown and described but one embodiment of the invention in order to illustrate it and are aware that changes can be made in construction and arrangement of the invention here shown without departing from the spirit thereof, and we do not, therefore, limit the invention to the particular showing here made for illustrative purposes, except as it may be limited by the hereto appended claims, broadly interpreted.

We claim:

1. In a ruler, in combination, two graduated members, a hinge member therefor composed of two complete ring members mounted to slide circumferentially and concentrically one within the other, said members being provided with graduation marks extending radially thereon, and said ruler members being secured, respectively to said ring members, whereby their ends move over said ring members and indicate by the graduation marks the angle of adjustment, substantially as described.

2. In a ruler, in combination with two graduated ruler members, of a hinge member comprising a ring provided in one face with a circumferentially extending groove and adapted to be secured to one of said ruler members, and another ring member slidably mounted in said groove and adapted to be secured to the other member of said ruler, one of said ring members being provided with radially extending graduation marks, and the end of each ruler member being adapted to move over the ring of the other member and indicate by the graduation marks the angle of adjustment, substantially as shown and described.

3. A combination ruler and protractor comprising in combination ruler members, one of which is provided with a spirit level bulb mounted in the edge thereof, and a hinge member therefor composed of two complete ring members mounted to slide circumferentially and concentrically one within the other, said ring members being provided with radially extending graduation marks corresponding to the degree divisions of a circle, and said ruler members being secured, respectively, to said ring members, whereby the end of each ruler member moves over the ring member of the other ruler member and indicates by the graduation marks the angle of adjustment of the two ruler members, substantially as shown and described.

Signed at Portland, Oregon, December 18th, 1911.

HENRY MEISTER.
GEORGE BIRNBACH.

In presence of—
CHAS. H. KOPF,
F. M. ROBINSON.

---

Copies of this patent may be obtained for five cents each, by addressing the "Commissioner of Patents, Washington, D. C."